United States Patent [19]

Michels et al.

[11] 3,846,985

[45] Nov. 12, 1974

[54] DEVICE FOR CONVERTING THERMAL ENERGY INTO MECHANICAL ENERGY

[75] Inventors: Albertus Peter Johannes Michels; Franciscus Wilhelmus Engelbert Gasseling; Carl Fridriech Johan Findhammer, all of Emmasingel, Eindhoven, Netherlands

[73] Assignee: U.S. Philips Corporation, New York, N.Y.

[22] Filed: Apr. 16, 1973

[21] Appl. No.: 351,471

[30] Foreign Application Priority Data
Apr. 29, 1972 Netherlands .................... 7205878

[52] U.S. Cl. ............................ 60/521, 123/119 A
[51] Int. Cl. ........................ F03g 7/06, F25b 9/00
[58] Field of Search ............... 60/24, 39.52, 521; 123/119 A

[56] References Cited
UNITED STATES PATENTS

| | | | |
|---|---|---|---|
| 1,895,381 | 1/1933 | Genety | 123/119 A |
| 3,456,438 | 7/1969 | Meijer et al. | 60/24 |
| 3,476,524 | 11/1969 | Burke | 123/119 A UX |
| 3,546,876 | 12/1970 | Forrer et al. | 60/24 |
| 3,730,156 | 5/1973 | Sarto | 123/119 A |

Primary Examiner—Edgar W. Geoghegan
Assistant Examiner—H. Burks, Sr.
Attorney, Agent, or Firm—Frank R. Trifari

[57] ABSTRACT

A device for converting thermal energy into mechanical energy including a combustion chamber with air and fuel inlets, a flue gas outlet, and duct means with first and second flow restriction means for mixing a portion of the flue gas into the inlet air, the air flow being directly proportional to the pressure difference across the restriction means, and the flue gas flow being proportional to the square root of the pressure difference across the second restriction means.

9 Claims, 3 Drawing Figures

DEVICE FOR CONVERTING THERMAL ENERGY INTO MECHANICAL ENERGY

BACKGROUND OF THE INVENTION

The invention relates to a device for converting thermal energy into mechanical energy, provided with at least one combustion chamber to which is connected at least one supply duct for fuel, at least one supply duct for combustion air in which a restriction is incorporated, and at least one outlet duct for flue gases. A flue gas return duct is provided which communicates on the one side with the flue gas outlet duct and on the other side with the part of the combustion air supply duct which is located between the combustion chamber and the restriction. A further restriction is incorporated in the flue gas return duct.

Devices of this kind are known and used with hot-gas reciprocating engines, hot-gas turbines, internal combustion engines and the like. In these known devices, part of the flue gases discharged from the device is branched off, is mixed with combustion air, and is returned to the combustion chamber. Due to their heat capacity, the returned flue gases ensure that the combustion temperature in the combustion chamber does not become too high. It is thus achieved that nitrogen oxides are formed only to a limited extent. This is because the production of health-hazardous nitrogen oxides increases strongly as the temperature at which the combustion of the air-fuel mixture takes place increases. Consequently, devices of this kind offer the advantage that air pollution is minimized.

In a known device of the kind set forth (FIG. 5 of U.S. Pat. No. 3,456,438), the restriction and the further restriction are variable and consist of controllable valves for controlling the quantities of combustion air and flue gas flowing to the suction side of the combustion air fan.

SUMMARY OF THE INVENTION

The present invention has for its object to provide a device of the kind set forth in which automatically and for any operating condition of the device, the ratio of the quantity of drawn-in air/quantity of recirculated flue gas each time corresponding to a given quantity of drawn-in combustion air, is always such that the flue gases discharged to the ambient atmosphere are poor in nitrogen oxides.

To realize this object, the device according to the invention is characterized in that the restriction is constructed such that the combustion air flow passing through the restriction in any operating condition of the device is at least substantially directly proportional to the pressure difference prevailing across the restriction. A further restriction is constructed such that the flue gas flow passing through the further restriction in any operating condition of the device is at least substantially proportional to the square root of the pressure difference prevailing across the further restriction.

If the device requires more combustion air, the pressure on the outlet side of the restrictions (at the area where the flue gas return duct is connected to the combustion air supply duct) decreases while the pressures on the inlet sides of the two restrictions remain substantially constant and are substantially equal to atmospheric pressure.

The mass flow rate of combustion air through the restriction then increases substantially directly proportionally to the pressure difference across the restriction, while the mass flow rate of flue gas through the further restriction increases substantially proportionally to the square root of the pressure difference across this restriction.

This means that at lower loads of the device, when comparatively small quantities of combustion air are supplied, comparatively large quantities of flue gas are recirculated; at higher loads, when comparatively large quantities of combustion air are supplied to the device, comparatively small quantities of flue gas are recirculated.

The fact that a comparatively large quantity of flue gas is recirculated at lower loads is particularly advantageous in hot-gas engines and internal combustion engines for traction purposes. These engines usually have a low load in city traffic, and air pollution should be minimized particularly in these circumstances.

A comparatively large recirculation of flue gases in these circumstances not only ensures that only small quantities of nitrogen oxides are produced, but also only a small quantity of carbon monoxide. Moreover, it is also prevented that non-combusted carbon hydrates and soot are present in the exhaust gases. The latter is so because the flue gases ensure proper mixing of the air and the fuel, which results in proper combustion. The fact that a comparatively small flue gas recirculation takes place at higher loads offers the advantage in the hot-gas engine and the hot-gas turbine that the combustion air fan, also drawing in flue gas, may have a comparatively small power and small dimensions, while in the case of the internal combustion engine the maximum power to be delivered is only slightly reduced by the recirculation.

The two restrictions can be control members with a variable passage (control slides, choke valves, etc.) which are operated by the mass flow, each restriction maintaining the desired proportionality between passed mass flow and pressure drop across the control member, regardless of the type of mass flow (turbulent, laminar) in the control member.

In a preferred embodiment of the device according to the invention, the restriction is a permanently adjusted laminar restriction, the further restriction being a permanently adjusted turbulent restriction. Because of the laminar restriction in the combustion air supply duct, the laminar mass flow of combustion air through this restriction increases substantially directly proportionally to the pressure difference across this restriction. Because the further restriction is a turbulent restriction, the turbulent mass flow of flue gas through this restriction increases substantially proportionally to the square root of the pressure difference across this restriction.

Due to the fact that the laminar and the turbulent restriction do not comprise any moving parts and constitute fixed elements of the device, a structurally simple device is obtained. If the passages of the two restrictions are suitably chosen, a quantity of flue gas is recirculated throughout the entire operating range which is always sufficient to ensure that the combustion temperature in the combustion chamber remains sufficiently low to keep the production of nitrogen oxides negligibly small.

Another preferred embodiment of the device according to the invention is characterized in that the turbulent restriction is formed by a diaphragm. A diaphragm can be readily manufactured and mounted in the flue gas return duct.

When the device is started, there may in certain circumstances be the risk of incomplete combustion of the air-fuel mixture in the combustion chamber due to an excessively low combustion temperature as a result of a temporarily excessively low temperature of the recirculated flue gas which causes excessive cooling of the reacting air-fuel mixture. This drawback is eliminated according to the invention in that the device comprises a temperature-sensitive element which is controlled by the flue gas temperature and which opens a valve in the flue gas return duct when the flue gas temperature exceeds a given minimum value, and which closes the said valve if the flue gas temperature drops below this minimum value. It is thus achieved that the flue gas is not recirculated during the cold start of the device.

The invention will be described in detail with reference to the diagrammatic drawing which is not to scale.

DESCRIPTION OF THE PREFERRED EMBODIMENT

Figure 1:
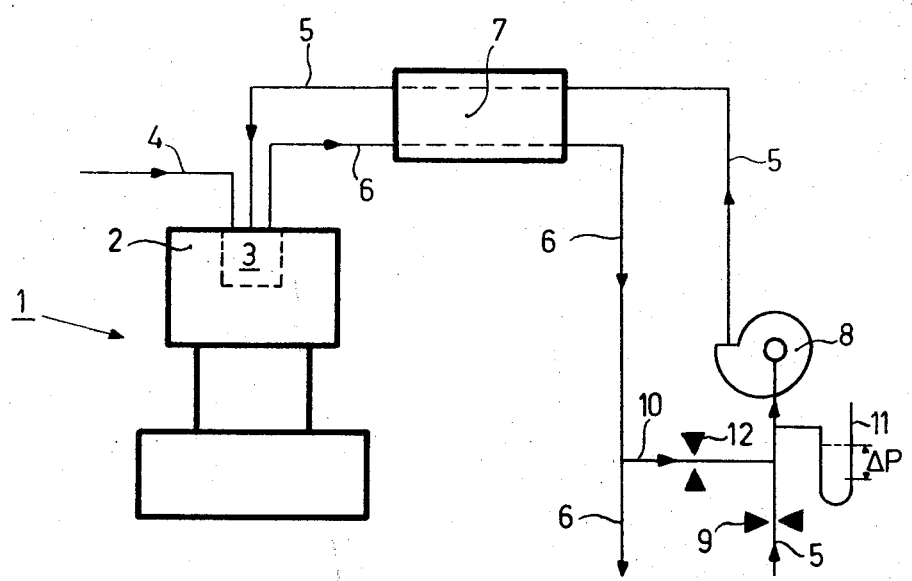
FIG. 1 shows a hot-gas engine with flue gas recirculation via the combustion air supply duct, a laminar restriction being incorporated in the combustion air supply duct and a turbulent restriction being incorporated in the flue gas return duct.

The reference 1 in FIG. 1 denotes a hot-gas engine, which is an engine in which a working medium completes a thermodynamic cycle in a closed working space during operation. Thermal energy originating from a burner device 2 is applied to this working medium by way of an external combustion process. The burner device 2 comprises a combustion chamber 3 to which are connected a fuel supply duct 4, a combustion air supply duct 5, and an outlet duct for flue gases 6. Provided in the combustion air supply duct and the flue gas outlet duct 6 is a heat exchanger 7, referred to as preheater, in which combustion air is preheated on its way to combustion chamber 3 by flue gases which are discharged to the ambient atmosphere. The supply of combustion air, in the desired ratio with respect to the supplied quantity of fuel, is effected by means of a fan 8. Arranged in the combustion air supply duct 5, on the suction side of the fan 8, is a laminar restriction 9. Arranged between the flue gas outlet duct 6 and the combustion air supply duct 5 is a flue gas return duct 10 which communicates with the part of the combustion air supply duct which is located between the fan 8 and the laminar restriction 9. Also connected to this part of the duct is a pressure gauge 11, the free end of which is in open communication with the ambient atmosphere. A turbulent restriction 12 is provided in flue gas return duct 10.

The laminar restriction 9 is chosen such that, regardless of the suction pressure of the fan 8, the flow of combustion air through this restriction is always laminar. The mass flow of air allowed to pass through laminar restriction 9 is then always substantially directly proportional to the pressure difference across this restriction; this is the pressure difference indicated by pressure gauge 11.

The turbulent restriction 12 is chosen such that, regardless of the suction pressure of the fan 8, the flow of flue gas through this restriction is always turbulent. The mass flow of flue gas which is drawn by the fan from the flue gas outlet duct 6 via the flue gas return duct 10, is then always substantially proportional to the square root of the pressure difference across this restriction; this is also the pressure difference indicated by the pressure gauge 11. This is because substantially atmospheric pressure prevails on the inlet sides of the two restrictions.

Figure 2:
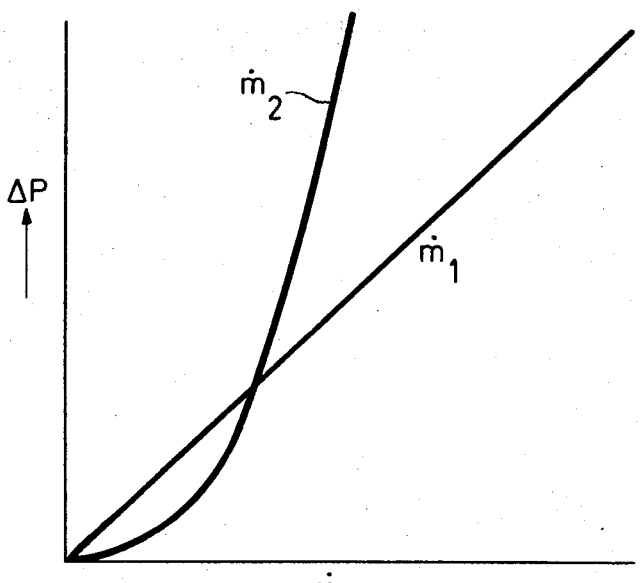
FIG. 2 shows the pressure difference across the two restrictions in dependence of the mass flows of combustion air and recirculated flue gas.

The relationship between the mass flows of combustion air and recirculated flue gas, respectively, and the pressure difference which is registered by the pressure gauge and which prevails across the two restrictions is as shown in FIG. 2. The pressure difference $\Delta P$ is plotted in the vertical direction, the mass flow m being horizontally plotted. The reference $\dot{m}_1$ is the graph for the combustion air mass flow, $\dot{m}_2$ denoting the graph for the recirculated mass flow of flue gas.

It follows from the FIG. 2 that as $\Delta P$ increases, i.e. when the engine requires more combustion air, the ratio $\dot{m}_2/\dot{m}_1$ decreases.

In other words: at lower engine loads, when a comparatively small quantity of combustion air is drawn in, a comparatively large quantity of flue gas is at the same time drawn in, whilst at higher engine loads, when a comparatively large quantity of combustion air is required, a comparatively small quantity of flue gas is added to the combustion air.

The loading of car engines and the like is usually small in urban areas. The fact that in the present case a comparatively large quantity of flue gas is then recirculated ensures clean exhaust gases. Both the production of nitrogen oxides and carbon monoxide is then low, while the favorable combustion, resulting from the improved mixing of air and fuel due to the flue gases, prevents the presence of non-combusted carbon hydrates and soot in the exhaust gases.

Because a comparatively small quantity of flue gas is recirculated at higher loads, the overall gas flow to be transported by the fan remains within acceptable limits. This means that a fan of comparatively small capacity and comparatively small dimensions can be used.

The system is very simple because fixed restrictions are used which need not be readjusted at all during operation.

Figure 3:
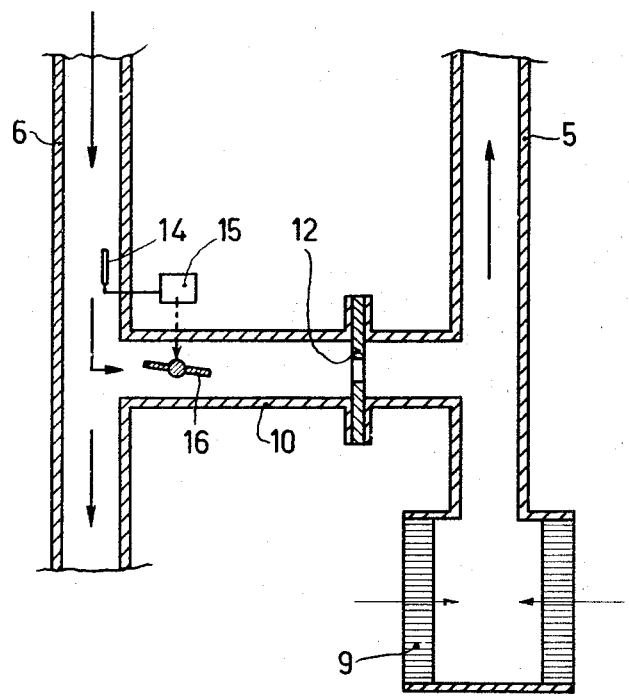
FIG. 3 shows a part of a combustion air supply/flue gas recirculation-system in which the laminar restriction consists of a system of narrow ducts and the turbulent restriction is a diaphragm, a valve operated by a temperature-sensitive element being provided in the flue gas return duct.

FIG. 3 shows a feasible practical embodiment of the combined combustion air supply/flue gas recirculation system. The same reference numerals are used for the parts which correspond to the system of FIG. 1. The laminar restriction 9 is now constructed as a system of fine ducts, while the turbulent restriction 12 is formed by a diaphragm. The construction of the system is thus very simple. It is obvious that a variety of other constructions are feasible. For example, the flue gas return duct 10 itself can be constructed such that it forms the turbulent restriction itself.

The system shown is not only suitable for hot-gas engines, but can also be used in turbines with or without closed cycle (hot-gas turbine), in internal combustion engines (Otto and Diesel engines) and the like.

FIG. 3 furthermore shows a temperature-sensitive element 14, arranged in the flue gas outlet duct 6, which can operate a valve 16 in the flue gas return duct 10 via a control device 15. If the device in which the system shown is incorporated is not in operation, valve 16 is closed so that duct 10 is blocked. When the device is started, when the flue gases are still comparatively cold, the valve remains closed until the flue gas temperature reaches a given minimum value. At that instant the element 14 ensures that the valve 16 is opened and remains open during the further operation. It is thus achieved that no comparatively cold flue gas is recirculated when the device is started. Incomplete combustion of the air-fuel mixture in the combustion chamber of the device as a result of excessive cooling by flue gas is thus prevented.

When the device is put out of operation, valve 14 is closed again when the temperature in the flue gas outlet duct 6 reaches the minimum value.

The temperature-sensitive element 14 can be, for example, a thermocouple which supplies an electrical signal to the control device 15 which controls the valve 16 which is constructed as an electromagnetic valve. It is alternatively possible to use a bimetal as a temperature-sensitive element which mechanically operates the valve 16.

What is claimed is:

1. In an apparatus for converting thermal energy into mechanical energy, and operable with a source of fuel and a source of air, and including a combustion chamber, a first duct for flowing air from said air source to said chamber and a second duct for discharging flue gas from said chamber, and a third return flow duct for flowing some flue gas from the second duct to the first duct, the improvement in combination therewith of flow control means comprising first restrictor means in said first duct, second restrictor means in said third duct, said third duct having a discharge end feeding said first duct at a point therein intermediate the first restrictor means and the chamber, said first restrictor means permitting air flow directly proportional to the pressure difference across said first restrictor, and said second restrictor means permitting flue gas flow directly proportional to the square root of the pressure difference across said second restrictor.

2. Apparatus according to claim 1 wherein said first restrictor means is permanently adjusted and provides laminar flow of the gas therethrough, and the second restrictor means is permanently adjusted and provides turbulent flow of said gas therethrough.

3. Apparatus according to claim 2 wherein said second restrictor means comprises a diaphragm with an aperture therethrough.

4. Apparatus according to claim 1 further comprising means in said second duct for sensing the temperature therein and providing a corresponding signal, valve means in said third duct for controlling the flow therethrough, and control means operable by said temperature sensing means to adjust and control said valve means, such that when the temperature exceeds of a predetermined value in said third duct said valve will open, and conversely when temperature is below a predetermined value, said valve closes.

5. Apparatus according to claim 1 further comprising a heat exchange means engaging said first and second ducts whereby heat from said flue gas is transferred to said air.

6. Apparatus according to claim 1 wherein said apparatus is a Stirling hot-gas engine.

7. Apparatus according to claim 1 wherein said apparatus is an internal combustion engine.

8. Apparatus according to claim 1 wherein said apparatus is a hot-gas turbine.

9. Apparatus according to claim 2 wherein said third duct is formed to comprise said second restrictor means.

* * * * *